G. PERRINE.

DUMPING RECEPTACLE.

APPLICATION FILED MAR. 4, 1915.

Reissued Aug. 24, 1915.

13,968.

3 SHEETS—SHEET 1.

Witnesses:

Wm Rohleber

John J. Bullard

Inventor,

George Perrine,

By his Attorneys

Kerr Page Cooper & Hayward

G. PERRINE.

DUMPING RECEPTACLE.

APPLICATION FILED MAR. 4, 1915.

Reissued Aug. 24, 1915.

13,968.

3 SHEETS—SHEET 2.

Witnesses:

Wm. Bokleber

John J. Bullard

Inventor,

George Perrine,

By his Attorneys

Kerr Page Cooper & Hayward

G. PERRINE.

DUMPING RECEPTACLE.

APPLICATION FILED MAR. 4, 1915.

Reissued Aug. 24, 1915.

13,968.

3 SHEETS—SHEET 3.

Witnesses:

Wm. Bohleber

John J. Bullard

Inventor,

George Perrine,

By his Attorneys

Kerr Page Cooper & Hayward

UNITED STATES PATENT OFFICE.

GEORGE PERRINE, OF NEW YORK, N. Y., ASSIGNOR, BY MESNE ASSIGNMENTS, TO PERCY JACKSON, TRUSTEE, OF NEW YORK, N. Y.

DUMPING-RECEPTACLE.

13,968. Specification of Reissued Letters Patent. Reissued Aug. 24, 1915.

Original No. 831,800, dated September 25, 1906, Serial No. 284,592. Application for reissue filed March 4, 1915. Serial No. 12,167.

*To all whom it may concern:*

Be it known that I, GEORGE PERRINE, a citizen of the United States, and a resident of the borough of Manhattan, city, county, and State of New York, have invented certain new and useful Improvements in Dumping-Receptacles, of which the following is a specification.

My invention relates to receptacles adapted to be loaded with stone or other material at one place, then carried over to the place of discharge, and there opened at the bottom to allow the material to drop out.

The object of my invention is to provide a device for the above-indicated class in which provision is made for the ready discharge of the material, as will be fully described hereinafter.

Reference is to be had to the accompanying drawings, in which—

Figure 1:
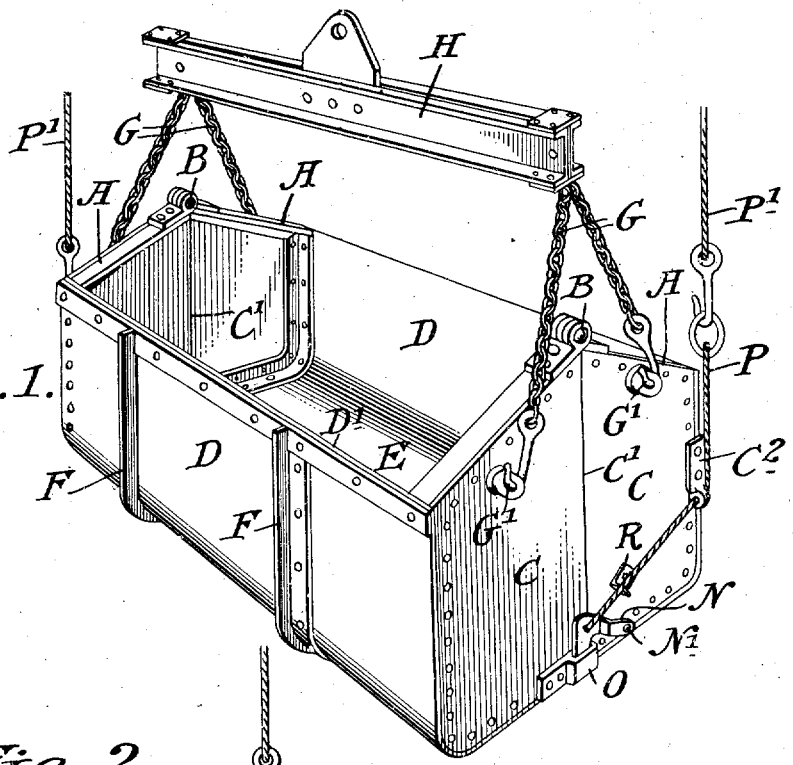
Figure 2:
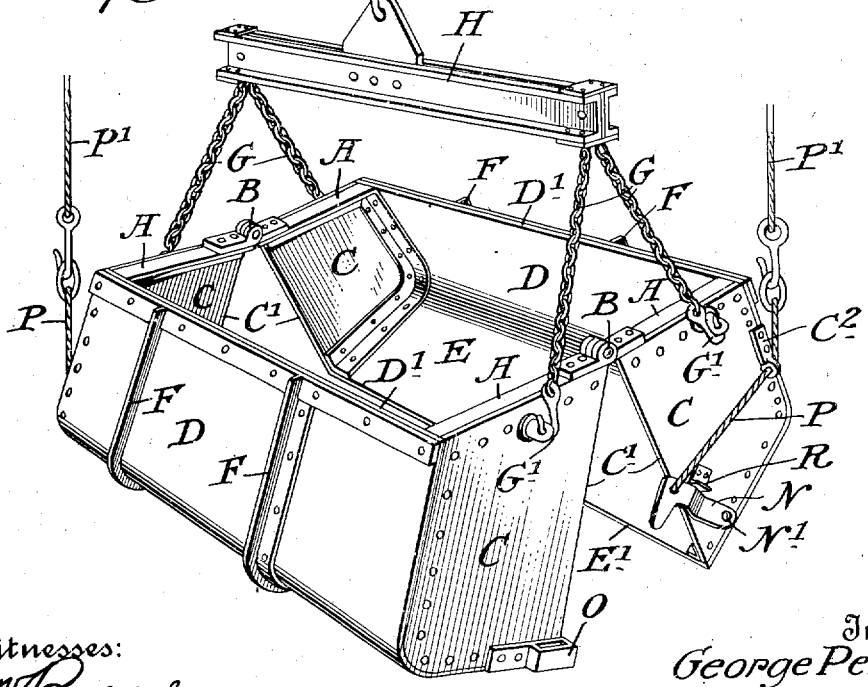
Figure 3:
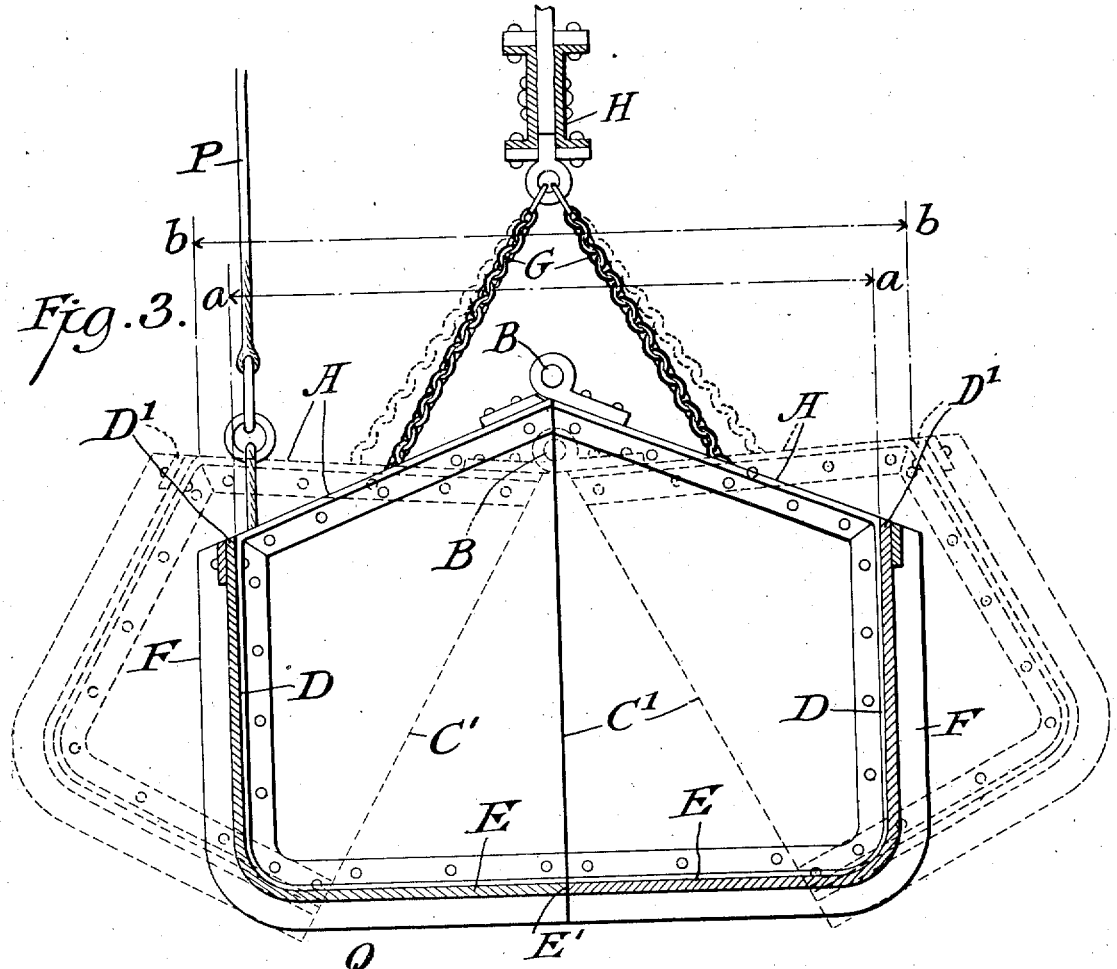
Figure 4:
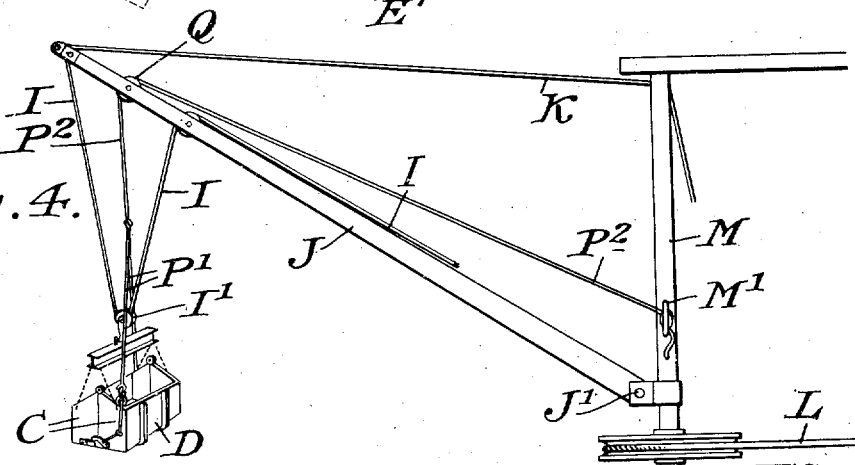
Figure 5:
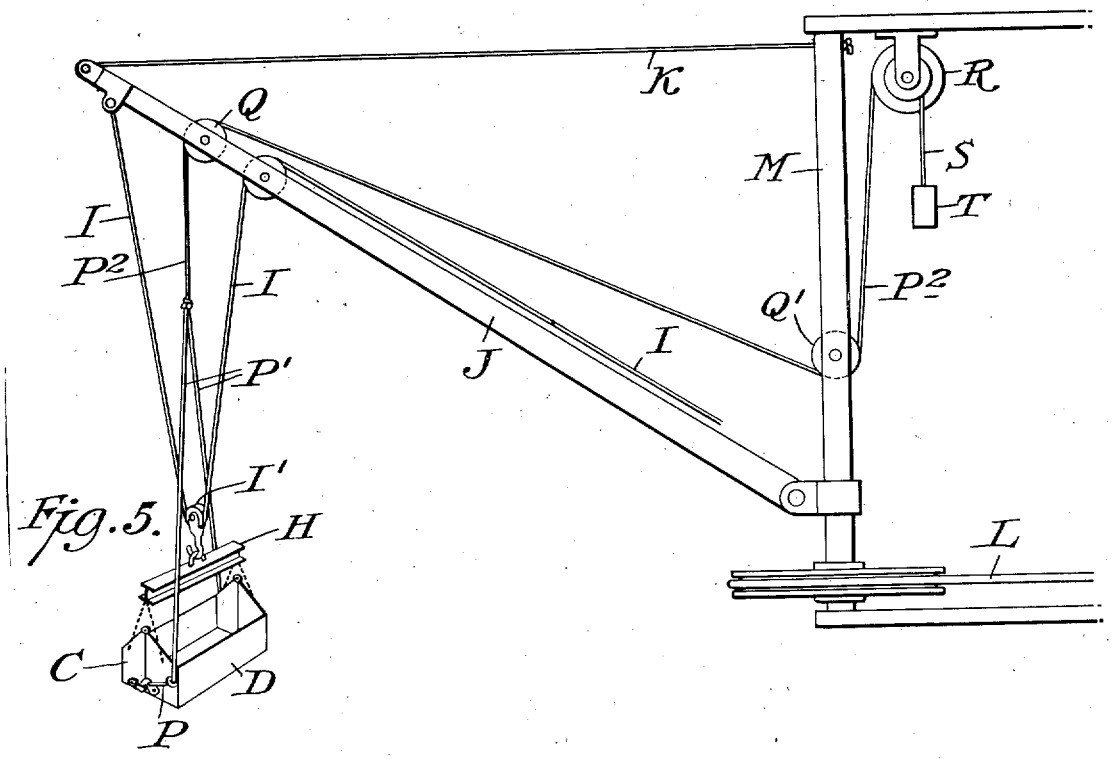
Figure 6:
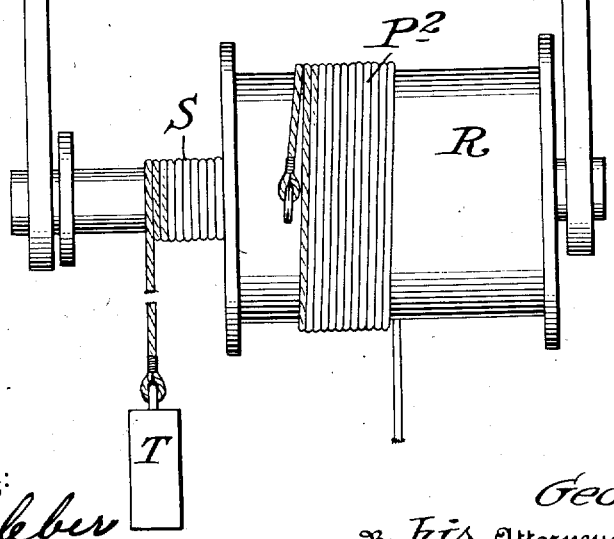

Figure 1 is a perspective view showing my improved receptacle closed. Fig. 2 is a similar view showing the same open. Fig. 3 is a cross-sectional elevation. Fig. 4 is a perspective view showing my invention in connection with a derrick structure. Fig. 5 is a perspective view showing another form of my invention, and Fig. 6 is an elevation of a portion of the apparatus shown in Fig. 5.

The improved dumping-receptacle comprises two sections, the upper edges A of which at the ends run obliquely upward when the receptacle is closed and in such position converge toward the hinges B, which connect the two sections. The receptacle as a whole is of elongated substantially rectangular form with the sections hinged or pivoted to each other about a longitudinal axis. The ends C of the sections are provided with meeting edges C′, which are vertical when the receptacle is closed and which form acute angles with the upper edges A. The side D and the bottom E of each section, as shown, are formed in one piece of sheet metal suitably strengthened by ribs F. The meeting edges E′ of the bottoms extend horizontally, and the upper edges D′ of the sides are preferably also horizontal. At suitable points of the ends C, near the upper edges thereof, chains G or other suspending devices are detachably secured to the receptacle-sections. The points of attachment should be so located that when the receptacle is closed the vertical lines drawn through the centers of gravity of each section will pass outside the attaching-points G′. Thus the weight of the sections, as well as the weight of the material contained in the receptacle, will tend to keep the receptacle closed. In the drawings I have shown a beam H, to which the chains G are attached, said beam being suspended by means of a cable I and pulley I′ from the swinging arm J of a derrick, the cable I serving to hoist the receptacle and lower it, another cable K serving to raise or lower the arm J, while a third cable L serves to turn the post M, to which the arm J is pivoted at J′. At each end of the receptacle I prefer to arrange a latching device, consisting of a latch N pivoted at N′ to one section, and a keeper O, secured to the other section and adapted to receive the end of hook of said latch. Each latch is connected with a rope or wire P, passing through a suitable guide $C^2$ at the outer portion of the respective end C, and each rope P is detachably connected with a rope P′, attached to a rope $P^2$ and passing over a pulley Q to a suitable securing device or cleat M′ on the post M.

The operation is as follows: The receptacle being in the condition illustrated by Fig. 1, the material is loaded into the same through the open top. It is not necessary that the receptacle be connected with the derrick during the loading operation, as the receptacle might be loaded at one place and then brought under the derrick by a car or other conveyance and thereupon attached to a derrick. Then the receptacle is raised by a pull on the cable I, and the post M is swung by means of the cable L until the receptacle is above the intended point of discharge. The wires or ropes $P^2$ are secured to the cleat M′ in such a manner as to cause the receptacle to be unlatched and to open at the proper point as the receptacle is lowered. It will be understood that the ropes P P′ $P^2$ are at first slack; but when the receptacle has descended to a predetermined point such ropes will become taut, and the further descent of the receptacle will cause the latches N to be lifted from the keepers O, and then as the latches are swung against stops R the pull or resistance of the ropes P′ will be transferred to the guides $C^2$, and thus gravity will cause the receptacle to open, as illustrated in Figs. 2 and 3, it being understood that the guides $C^2$ are located exteriorly of the vertical lines passing through the centers of gravity of the two sections. After discharge the receptacle is raised again and will close automatically.

The latches N are used for the sake of safety only and may be dispensed with, if desired, in which case the ropes P′ would be simply secured at the outer portions of the receptacle-sections—for instance, at the points indicated by the guides $C^2$.

The fact that the upper edges A of the ends C form acute angles with the vertical meeting edges C′ is of considerable advantage as regards facilitating the discharge of the material. This advantage will be best understood by reference to Fig. 3. *a* indicates the width of the opening at the top of the receptacle when closed. Now as the sections of the receptacle open by swinging on the hinges B, which hinges are above the level of the top opening of the receptacle, the opening will gradually increase in width until, with the sections open, it has the width indicated at *b*. Therefore should any rocks or other material be caught on the upper edges of the receptacle during loading and partly overhang above the open top of the receptacle, such projecting material will drop into and through the receptacle as the top opening becomes enlarged during the discharge operation. The operation of the dumping-receptacle is thus rendered more reliable, and danger to attendants is minimized, as there is less likelihood of projecting material falling on the outside of the receptacle during discharge and causing accident. Furthermore, the flexible opening device, which is detachably connected to said sections, has its pull applied at points $C^2$ exteriorly of vertical lines passing through the centers of gravity of the two sections and substantially below the upper edge of the sections. This part of the construction not only effects a quick opening of the receptacle but permits the sections to be sufficiently separated to readily discharge the contents of the same.

Instead of having the rope $P^2$ attached to the cleat M′, I may (as shown in Figs. 5 and 6) pass it under a pulley Q′ and fasten its end to a double pulley R, provided with a rope S and weight T, so arranged as to keep the ropes P P′ $P^2$ taut, yet allow them to be paid out until the rope $P^2$ has been unwound fully. As soon as this happens the latches N will be released. The time at which the unlatching will occur is governed by the number of turns of the rope $P^2$ originally wound on the pulley or drum R. Other means may be employed for operating the latches at the proper moment.

I claim as my invention:

1. A dumping receptacle comprising hinged sections, in combination with a boom, a suspending device for the receptacle extending from the boom and consisting of a beam the length of which is substantially equal to the longitudinal length of the receptacle, said beam suspended from the boom by means of a cable and provided with flexible means at each end detachably connected to each of said sections, a flexible opening device detachably connected with the outer portions of said sections, a guide on the boom engaged by said opening device, and means for varying the operative length of said device.

2. A dumping receptacle comprising two open-top sections hinged together at their meeting portions, the hinge-joint being located above the open top of said sections in the closed position of said receptacle, in combination with a boom, a suspending device for the receptacle extending from the boom and consisting of a beam the length of which is substantially equal to the longitudinal length of the receptacle, said beam suspended from the boom by means of a cable and provided with flexible means at each end detachably connected to each of said sections, a flexible opening device detachably connected to said sections and the pull of which is applied at points exteriorly of the vertical lines passing through the centers of gravity of the two sections and substantially below the upper edge of the sections, whereby a quick opening and a substantial separation of the sections for the discharge of the material is facilitated, a guide on the boom engaged by said opening device, and means for varying the operative length of said device.

In testimony whereof I affix my signature in the presence of two subscribing witnesses.

GEORGE PERRINE.

Witnesses:

WM. BOHLEBER,

THOMAS J. BYRNE.